United States Patent [19]

van der Lely et al.

[11] 4,316,581
[45] Feb. 23, 1982

[54] SPREADER SUITABLE FOR SPREADING GRANULAR AND/OR POWDERY MATERIAL

[75] Inventors: Cornelis van der Lely, Zug, Switzerland; Ary van der Lely, Maasland, Netherlands

[73] Assignee: C. van der Lely, N.V., Maasland, Netherlands

[21] Appl. No.: 37,449

[22] Filed: May 9, 1979

[30] Foreign Application Priority Data

May 5, 1978 [NL] Netherlands .......................... 7804823

[51] Int. Cl.³ ............................................. A01C 17/00
[52] U.S. Cl. .................................... 239/682; 239/684; 239/687
[58] Field of Search ............... 239/659, 681, 682, 684, 239/687, 661, 667, 683, 685, 664

[56] References Cited

U.S. PATENT DOCUMENTS

| | | | |
|---|---|---|---|
| 719,620 | 2/1903 | Sester et al. | 239/683 X |
| 3,164,387 | 1/1965 | van der Lely | 239/661 |
| 3,693,890 | 9/1972 | Torrey | 239/684 X |
| 3,777,991 | 12/1973 | Picardat | 239/683 X |

FOREIGN PATENT DOCUMENTS

| | | | |
|---|---|---|---|
| 375143 | 7/1907 | France | 239/684 |
| 647268 | 11/1928 | France | 239/687 |
| 1269267 | 6/1960 | France . | |
| 1427991 | 12/1964 | France | 239/683 |
| 253906 | 3/1964 | Netherlands . | |
| 583135 | 12/1946 | United Kingdom | 239/682 |
| 586054 | 3/1947 | United Kingdom | 239/682 |
| 618205 | 2/1949 | United Kingdom . | |
| 899733 | 6/1962 | United Kingdom | 239/684 |
| 1164244 | 9/1969 | United Kingdom | 239/681 |

OTHER PUBLICATIONS

"Atlas Für Getriebe und Konstruktionslehre", by Alfred Widmaier, Verlag Konrad Wittwer, Stuttgart, Germany, Jul. 1954.

*Primary Examiner*—Andres Kashnikow
*Attorney, Agent, or Firm*—Penrose Lucas Albright

[57] ABSTRACT

A spreader suitable for spreading granular and/or powdery materials, such as seeds or fertilizer, comprises a distributor which has an upturned rim. The distributor can be driven in rotation or reciprocated about an axis which is inclined rearwardly from top to bottom at different speeds by means of a change-speed means. Frame members are orientated to prevent the least obstruction to material ejected past them by the distributor. A downwardly inclined deflector prevents material from impinging against a vehicle to which the spreader is hitched. The constructional features of the spreader contribute to an even distribution of material about the axis, regardless of the type of material being spread.

36 Claims, 7 Drawing Figures

SPREADER SUITABLE FOR SPREADING GRANULAR AND/OR POWDERY MATERIAL

SUMMARY OF THE INVENTION

This invention relates to a spreader suitable for spreading granular or powdery material or both, such as fertilizer or seeds.

According to a first aspect of the present invention there is provided a spreader suitable for spreading granular or powdery material or both, the spreader comprising at least one distribution member which is drivable about an axis, the spreader including change-speed means whereby any one of at least two different speeds of movement of the distribution member can be obtained.

According to a second aspect of the present invention there is provided a spreader suitable for spreading granular or powdery material or both the spreader comprising a distribution member which is rotatable about an upwardly extending rotary axis and comprises a substantially continuous disc which is provided at its periphery with an upwardly directed rim.

According to a third aspect of the present invention there is provided a spreader suitable for spreading granular or powdery material or both, the spreader comprising at least one distribution member which is drivable about an upwardly extending axis, a hopper for carrying the material to be spread and having a delivery portion extending sideways with respect to the height of the hopper, and drive means including transmission means for driving the distribution member, the delivery portion being located between the distribution member and the transmission means.

According to a fourth aspect of the present invention there is provided a spreader suitable for spreading granular or powdery material or both, the spreader comprising at least one distribution member which is drivable about an axis, a deflector plate being arranged adjacent at least part of the circumference of the distribution member, the deflector sloping from a level above the distribution member downwardly, in a direction away from the rotary axis of the distribution member, to a level below the distribution member.

According to a fifth aspect of the present invention there is provided a spreader suitable for spreading granular or powdery material or both, the spreader comprising a distribution member which is drivable about an upwardly extending axis, and coupling members for hitching the spreader to a vehicle, the distribution member being disposed near the coupling members in such an orientation that, during operation when hitched to a vehicle, said axis is inclined from top to bottom away from the vehicle.

According to a sixth aspect of the present invention there is provided a spreader suitable for spreading granular or powdery material or both, the spreader comprising a distribution member which is drivable about an axis and a frame on which the distribution member is arranged, the frame comprising frame parts extending across the path of material ejected in use, by the distribution member and having, as viewed in cross-section taken on a plane perpendicular to the rotary axis of, and at the level of, the distribution member, an elongate cross-sectional shape, the length of the cross-sectional shape of each of the said frame parts being at least substantially parallel to the direction in which, in use, the material is ejected by the distribution member past frame parts.

For a better understanding of the present invention and to show how it may be carried into effect, reference will now be made, by way of example only, to the accompanying drawings, in which:

DESCRIPTION OF THE PREFERRED EMBODIMENTS

Referring to FIGS. 1 to 5, the spreader comprises a frame 1 provided with a hopper 2 and a distribution member 3. The frame 1 comprises an upwardly extending frame portion 4 and an approximately horizontal frame portion 5, which is substantially perpendicular to the portion 4. The frame portion 4 comprises a V-shaped frame beam 6, the limbs of which diverge from top to bottom and are interconnected at the top by a curved part 7.

The ends of the frame beam 6 are secured to the ends of a substantially horizontal crossbar 8. The crossbar 8 is located at a higher level than the distribution member 3 and is fastened by means of upwardly extending strips 10 and 11 to a further crossbar 9. The crossbar 9 is parallel to the crossbar 8 and is located at a lower level than the distribution member 3.

At the center of the crossbar 9 is secured a frame beam 12 of the frame portion 5; the frame beam 12 is perpendicular to the crossbar 9. Between the frame beam 12 and the crossbar 9 there are struts 15 and 16 which meet the crossbar 9 at positions which are a distance 19, equal to about one quarter of the length of the crossbar 9 from the center of the crossbar 9. The struts 15 and 16 are secured to the beam 12 at a location which is a distance 17 from the crossbar 9, this distance 17 being substantially equal to half the distance 18 for which the beam 12 extends beyond the crossbar 9. At the end away from the crossbar 9, the beam 12 has a downwardly inclined portion 13, the lower end of which is provided with a supporting plate 14. The centerline of the beam 12 lies in a vertical plane 20 containing the longitudinal centerline of the spreader and the rotary axis 39 of the distribution member 3. The crossbars 8 and 9 are spaced apart by a distance 22, which is substantially equal to one fifth of the height 32 of the frame portion 4.

During operation of the spreader, the frame portion 4 is inclined rearwardly from top to bottom by a greater angle than the rotary axis 39. The frame portions 4 and 5 are at an angle 48 of about 110° to one another.

Near its ends, two lugs 23 are fixed to the crossbar 8 which point forwardly with respect to the intended direction of operative travel 44. The lugs 23 are coupled with the lower lifting arms 45 of the hitch of a tractor 46. The top of the frame beam 6 has forwardly extending lugs 24, which are coupled with the top arm 47 of the hitch of the tractor 46. The lugs 23 and 24 constitute coupling members.

Figure 4:
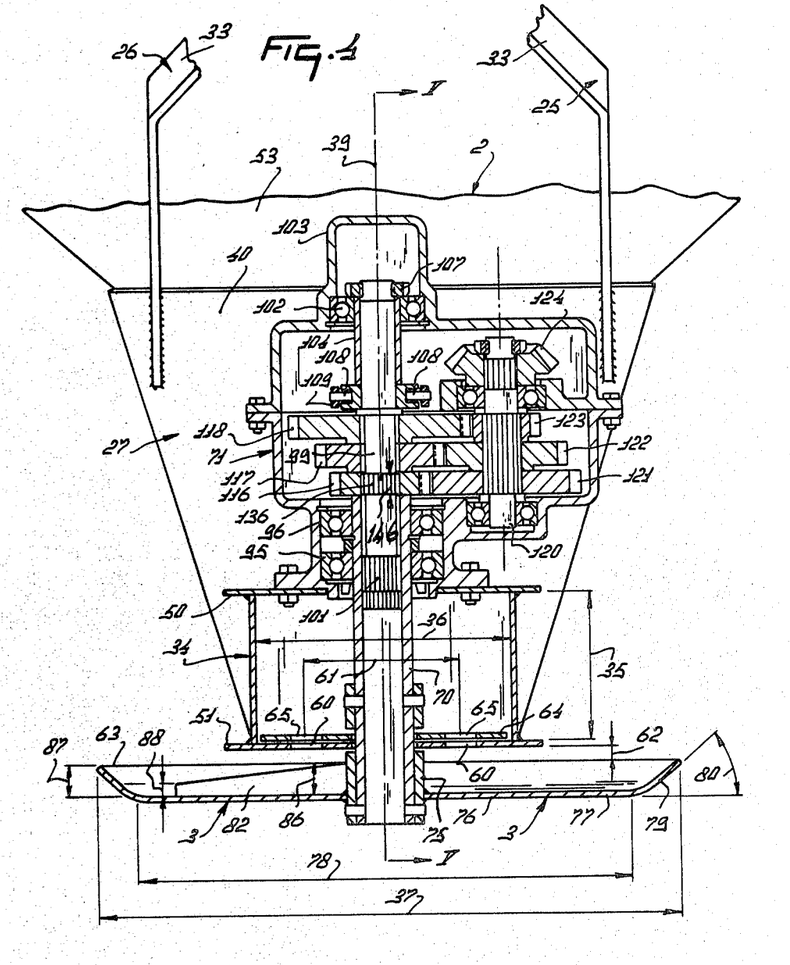
FIG. 4 is an enlarged sectional view taken on the line IV—IV in FIG. 1.

Fixed to the top of the frame beam 6 are supporting arms 25 and 26, which are inclined to the rear from top to bottom of the beam 6 and are parallel to one another for a distance, and then diverge downwardly at the region 33, their lower end regions again being parallel to one another (FIG. 4). These arms 25 and 26 are rigidly secured to a front wall 40 of a lower portion 27 of the hopper 2. The hopper portion 27 is supported at its rear wall 41 by a strip 28, the lower end of which is fastened to the beam 12. A releasable hopper portion 29 is fitted on top of the hopper portion 27, which is rigidly secured to the frame. The hopper portion 29 has a fastening member 31 which releasably connects it with a strip 30 secured between the supporting arms 25 and 26.

The hopper portion 27 has an outlet part 34 extending forwardly relative to the generally upwardly extending hopper portions 27, 29, with respect to the direction 44. The outlet part 34 has a height 35 of about ten centimeters. The wall of the outlet part 34 away from the hopper portion 27 is arcuate, centered on the rotary axis 39. This part has a diameter 36 of about sixteen centimeters. The diameter 36 is substantially equal to half the diameter 37 of the distribution member 3. The outlet part 34 extends for a distance 38 from the front wall 40 of the hopper portion 27. The distance 38 is substantially equal to the diameter 36. The top wall 50 of the outlet part 34 is substantially perpendicular to the front wall 40 of the hopper portion 27. The lower wall 51 of the outlet part 34 is parallel to the top wall 50. The lower wall 51 is at an angle 42 of about 30° to the rear wall 41 of the hopper portion 27. The rear wall 52 of the hopper portion 29 is in line with the wall 41. The front wall 53 of the hopper portion 29 is parallel to and in contact with the arms 25 and 26. The front wall 53 extends beyond the top of the beam 6 of the frame portion 4.

The distribution member 3 is underneath the outlet part 34. The distribution member 3 is substantially parallel to the lower wall 51 of the outlet part 34. The lower wall 51 has four outlet ports 60 regularly distributed around the rotary axis 39 on a circle having a diameter 61, which is slightly larger than half the diameter 36. The wall 51 is perpendicular to the rotary axis 39 and is a distance 62 above the top edge 63 of the distribution member 3. Above the wall 51, inside the outlet part 34, there is a closing member 64 with four ports 65. The ports 65 are located on a circle having the same diameter as that of the circle on which the ports 60 are located. The number of ports 65 is equal to the number of ports 60 and the ports 65 have the same shape as the ports 60. In this embodiment the ports 60 and 65 are circular. The ports 65 are regularly distributed, like the ports 60, around the axis 39. The closing member 64 is connected with an actuating arm 66, which projects from the outlet part 34. The actuating arm 66 is preferably adapted be secured, as desired by selectively clamping or fastening same relative to wall 51 in any one of a plurality of positions. Preferably the arm 66 is movable along a scale so as to provide a visible indication of which position the ports 65 occupy with respect to the ports 60. This is well within the skill of the art and not, therefore, necessary to illustrate in detail in the drawings.

The distribution member 3 is rigidly secured to a hollow shaft 70, which is centered on the axis 39 and passes through the outlet part 34. It is journalled in a gear box 71. The gear box 71 is rigidly secured to the top wall 50 of the outlet part 34 and to the wall 40 of the hopper portion 27. The gear box 71 constitutes part of driving means for the distribution member 3 and comprises transmission means formed by pinions. The gear box 71 is located between the outlet part 34 and the front wall 53 of the hopper 2.

The distribution member 3 has a hub 75 secured to the shaft 70. The distribution member 3 comprises an uninterrupted disc 76, which is secured to the hub 75. The disc 76 provides the operative surface of the distribution member and covers the entire diameter 37 of the distribution member. The disc 76 has a central portion 77 having a diameter 78 which is substantially equal to seven-eighths of the diameter 37. The central portion 77 is flat and perpendicular to the shaft 70 and to the rotary axis 39. At the periphery of the disc 76 there is a rim 79 which is inclined upwardly in the radially outward direction so that it is flared in the upward direction. The rim 79 lies in a conical plane and is at an angle 80 (which in this embodiment is 45°) to the central portion 77. The angle 80 is preferably larger than 30° and smaller than 60°. The rim 79 merges into the central portion 77 through a short curve. In this embodiment the central portion 77 has four ejector blades 82, which extend from the hub 75 to near the rim 79, the outer ends of the ejector blades lying on a circle having a diameter 83, this being about three quarters of the diameter 37. From FIG. 2 it will be appreciated that the blades are slightly curved, and end regions 84 extending substantially radially of the rotary axis 39. The concave sides of the blades face forwardly with respect to the normal intended direction of operative rotation 85. The ends of the blades 82 nearer the rotary axis 39, these ends being fastened to the hub 75, have a height 86 equal to the height 87 of the rim 79. The ends of the blades away from the axis 39 have a height 88, which is substantially equal to half the height 86. In this embodiment the height 83 is rather less than half the height 86. The height 87 of the rim 79 is preferably greater than about one and one-half centimeters but not larger than about five centimeters. In this embodiment the height 87 is about three centimeters.

In the outlet part 34, a blade 90 is fixed on the shaft 70. This blade 90 is substantially parallel to the bottom wall 51 and to the closing member 64. The blade 90 is located directly above the closing member 64.

Figure 1:
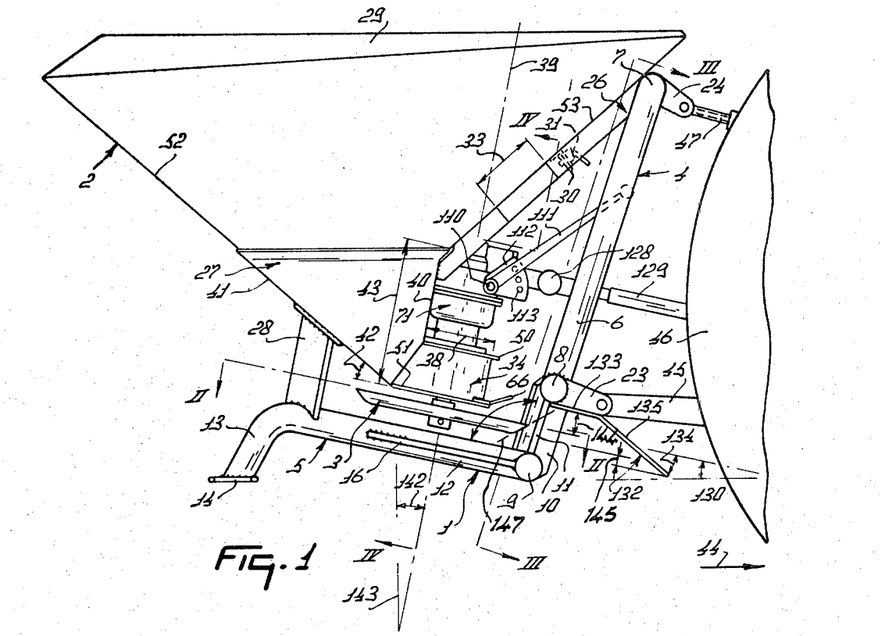
FIG. 1 is a side elevation of a spreader.

The shaft 70 extends into the lower region of the gear box 71 where it is supported by two bearings 95 and 96. It is retained against axial displacement with respect to these bearings and to the gear box 71. For a length 97, the interior of the shaft 70 is provided with splines 98. The top end of the shaft 70 receives part of a shaft 99, the lower end of which is provided over a length 100 with splines 101, co-operating with the splines 98. The top end of the shaft 99 is journalled in a bearing 102, which is mounted in the top wall 103 of the gear box 71. The top end of the shaft 99 is surrounded by a sliding sleeve 104, which is displaceable with respect to the bearing 102 and supports the shaft 99 in the bearing 102. The shaft 99 is provided with a fixed ring 105. Above the ring 105 there is a collar 106, which is rotatable about the shaft 99. The sleeve 104 is axially retained between the collar 106 and a nut 107 provided at the top end of the shaft 99. Pins 108 are provided diametrically opposite one another in the collar 106 and are fastened to a fork 109, which is rigidly secured to a shaft 110 journalled in the gear box 71. An actuating lever is rigidly connected to the shaft 110 (FIG. 1). The actuating lever 111 slopes upwardly and forwardly away from the gear box 71. The actuating lever 111 is displaceable over a setting plate 112 having three fastening members 113, in any one of which the arm 111 can be optionally fixed. Between the ring 105 and the top end of the shaft 70 the shaft 99 carries three pinions 116, 117 and 118 which are rotatable about the shaft 99 but are axially fixed to it. The pinions 116 to 118 have different diameters from one another and the pinions have different numbers of teeth. The diameters of the pinions 116 to 118 increase from the pinion 116 to the piston 118. In the gear box 71 a shaft 120 is journalled, parallel to the shaft 99. Three pinions 121, 122 and 123 are rigidly secured to the shaft 120 and mesh with the pinions 116 and 118 respectively. The diameter of the pinion 121 is the largest and the diameter of the pinion 123 is the smallest of the three pinions 121 to 123. A bevel pinion 124 is rigidly secured to the shaft 120, this bevel pinion 124 being in mesh with a bevel pinion 125 arranged on an input shaft 126, which is perpendicular to the shaft 120 and is journalled in the upper region of the gear box 71. The shaft 126 has a splined portion 127 which projects from the gear box, and a coupling 128 (FIG. 1) can be fastened to this splined portion 127. This coupling 128 is part of an auxiliary shaft 129 connected with the power take-off shaft of the tractor 46.

For operation, the spreader is attached to the hitch of a tractor 46 as is shown in FIG. 1. The input shaft 126 is connected by the coupling 128 and the auxiliary shaft 129 with the power take-off shaft of the tractor 46. In practice the spreader is preferably attached to the tractor in a manner such that the rotary axis of the distribution member 3 is parallel to a plane perpendicular to the surface to be covered. In this embodiment, as is shown in FIG. 1, the distribution member 3 is at an angle 130 of about 15° to the surface 131 to be covered.

The material to be spread is carried in the hopper 2. From the hopper 2 the material is supplied through the outlet part 34 and passes through the ports 60 to the distribution member 3. The distribution member 3 is rotated through the transmission in the gear box 71 by the power take-off shaft of the tractor, the distribution member rotating in the direction of the arrow 85 in FIG. 2. The rate of flow of material from the hopper 2 to the distribution member 3 can be controlled by the degree of overlap of the ports 65 and 60. For this purpose the control member 64 is selectively secured, as desired, in any one of a plurality of positions by moving the actuating arm 66. The flow of material from the hopper 2 through the ports 65 and 60 is improved by the blade 90, which rotates with the shaft 70 about the rotary axis 39 when the distribution member 3 rotates. The flow of material from the hopper portions 27 and 29 to the outlet part 34 is improved by virtue of the downwards inclination of the part 34 away from the portion 27. The outlet part 34 is thus continuously and readily filled with material issuing from the rest of the hopper.

In order to obtain a uniform flow of material to the distribution member all around the rotary axis 39, the bottom wall 51 with the outlet ports 60 is located at a comparatively small distance 62 above the distribution member. The distance 62 is preferably not more than about one centimeter. Thus, despite the inclination of the distribution member and of the outlet part 34 with respect to a vertical line designated by reference numeral 143 the material will fall onto the distribution member at substantially equal distances from the axis 39 all around the axis 39. The material falling from the outlet part 34 to the distribution member 3 drops onto the central portion 77 and is engaged by the blades 82. The rotation of the distribution member causes the material to be displaced towards the circumference of the distribution member over the flat central portion 77. At the outer edge of this central portion 77, the material arrives at the rim 79 sloping up from the central portion 77 and the speed of the material is consequently slightly reduced. Thus the material moves uniformly around the axis 39 up the rim 79 to be ejected from the circumferential edge of the distribution member. The material is thus uniformly distributed over 360° around the axis 39. The illustrated shape of the distribution member and, in particular, the upright rim 79, ensures a uniform distribution around the rotary axis 39 over and across the rim of the distribution member despite the fact that, for example, the ports 60 are spaced from one another around the axis 39. It is therefore possible in this case to limit the number of outlet ports 60, for example to three. In this embodiment four ports 60 are uniformly arranged around the axis 39. As an alternative, five or six outlet ports may be provided in the bottom wall 51.

Since the distribution member 3 spreads the material over 360° around the rotary axis 39, it is ejected by equal distances to each side of the vertical plane 20 containing the rotary axis 39 and extending in the direction of travel 44. The material ejected to the front with respect to the direction of movement 44 impinges on a deflector plate 132, which is fastened to the frame portion 4. The deflector plate 132 has a portion 133, which is parallel to the distribution member 3. This portion is in contact with the lower edges of the lugs 23. From the ends of the lugs 23 the deflector plate 132 is inclined downwardly from back to front, this downwardly inclined portion 135 being at an angle 134 of about 30° to a plane parallel to the distribution member 3 and perpendicular to the axis 39. The width of the deflector plate 132 is substantially equal to the width of the tractor so that the material does not hit the tractor 46 or whatever vehicle is carrying the spreader. Despite the location of the deflector plate 132 near the circumference of the distribution member, as shown in the side elevation of FIG. 1, the material will be distributed uniformly on the ground owing to the downwardly inclined portion 135 of the deflector plate 132. It is advantageous, particularly if the distribution member 3 is near the tractor, for it to be inclined as shown in FIG. 1. The disposition is such that the distribution member is inclined downwards in the direction towards the tractor. The rotary axis 39 is thus inclined rearwardly from top to bottom at an angle 142 of about 10° to 15° to vertical line 143 or at an angle of about 75° to 80° to the surface to be covered. In order to ensure satisfactory guidance of the material ejected from the standing rim 79 the portion 133 extends quite near to the distribution member 3 (FIG. 1). The portion 133 is a distance 144 above the upper edge of the distribution member 3 and the lower end of the portion 135 is a distance 145 below the lower surface of the member 3. A projected line 147 of the upright rim 79 intersects the deflector plate portion 133 as shown in the side elevation of FIG. 1.

Figure 5:
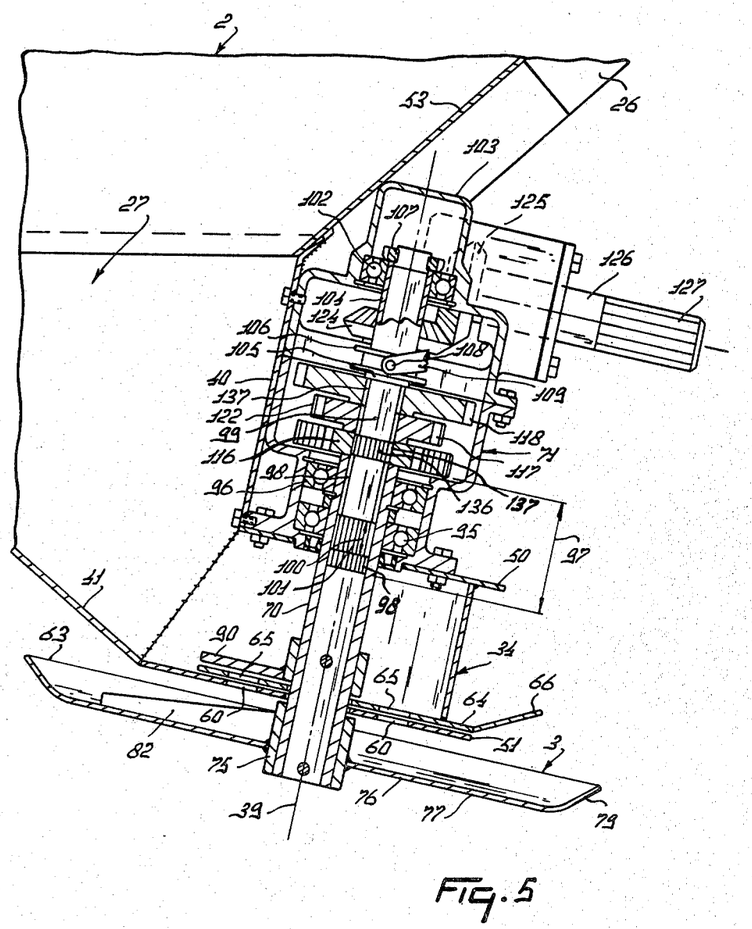
FIG. 5 is a sectional view taken on the line V—V in FIG. 4.

The width of spreading of the material depends upon the speed of rotation of the distribution member 3 and upon the kind and the density of the material. Large heavy granules are flung farther than powdery materials and granules of lower density. Thus, in order to control the spreading width it is advantageous to have the possibility of adjusting the speed of rotation of the distribution member. The speed of rotation may be adjusted within given limits continuously or in steps to any one of a plurality of values. In this embodiment the adjustment is provided by the transmission in the gear box 71, by which the speed of the distribution member can be set to any one of three different speeds of rotation, for the same speed of the power take-off shaft of the tractor. Thus, any one of the three sets of meshing pinions in the gear box 71 can be selected for driving the distribution member from the power take-off shaft. Preferably the distribution member is driven with a speed lying between 300 and 700 rev/min. In this embodiment the power take-off shaft drives the substantially horizontal input shaft 126 of the transmission gear. The shaft 126 drives the shaft 120 via the bevel pinions 124 and 125. Since the pinions 121 to 123 are rigidly secured to the shaft 120, they will always rotate with the shaft 120. Each of the pinions 116 to 118 will also always rotate because they are engaged by the pinions 121 to 123. By means of the splined portion 136 of the shaft 99, any one of the pinions 116 to 118 can be coupled by its splines 137 with the shaft 70. The splined portion 136 has a height 146 equal to the height of each pinion 116 to 118. As is shown in FIG. 5, the splined portion 136 co-operates with the splines 137 of the pinion 116. In this position the pinion 116 drives the shaft 99. The shaft 99 is coupled by the splines 101 with the splines 98 of the shaft 70. The shaft 99 can be moved axially by operating the lever 111 which acts through the pins 108 and the collar 106. From the position shown in FIG. 5 the shaft 99 can be moved upwardly for engaging splined portion 136 with the splines of either of the pinions 117 or 118. For this purpose sleeve 104 is axially slidable in the bearing 102, while the top part 103 of the gear box 71 has room for the upwards movement of the shaft 99 from the position shown in FIG. 5. During upward displacement of the shaft 99, the splines 101 move along the splines 98 of the shaft 70, so that the shaft 99 remains in engagement with the shaft 70. To this end the splines 98 of the shaft 70 cover the height 97. In order to hold the shaft 99 in position with the splines portion 136 in engagement with the splines 137 of the elected pinions 116 to 118, the actuating lever 111 co-operates with the three fastening members 113 (FIG. 1). The lever 111 can be fixed in any one of three positions relative to the setting plate 112, these positions corresponding to the engagement of the splined portion 136 with the splines of the pinions 116 to 118.

Figure 2:
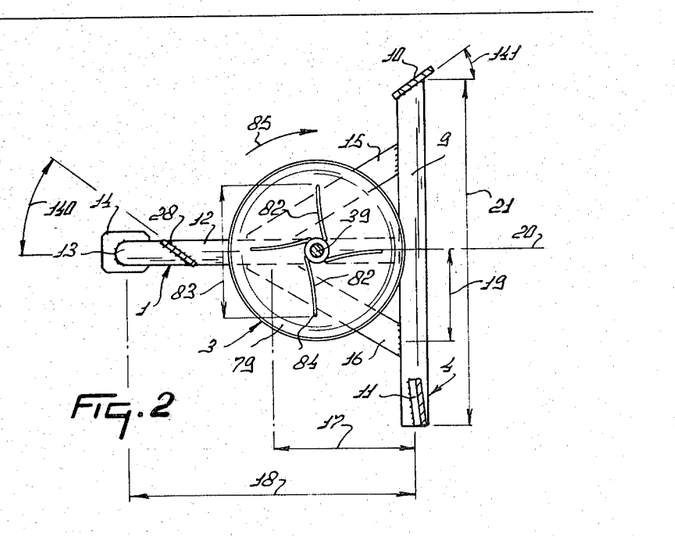
FIG. 2 is a sectional view taken on the line II—II in FIG. 1.
Figures 3, 6:
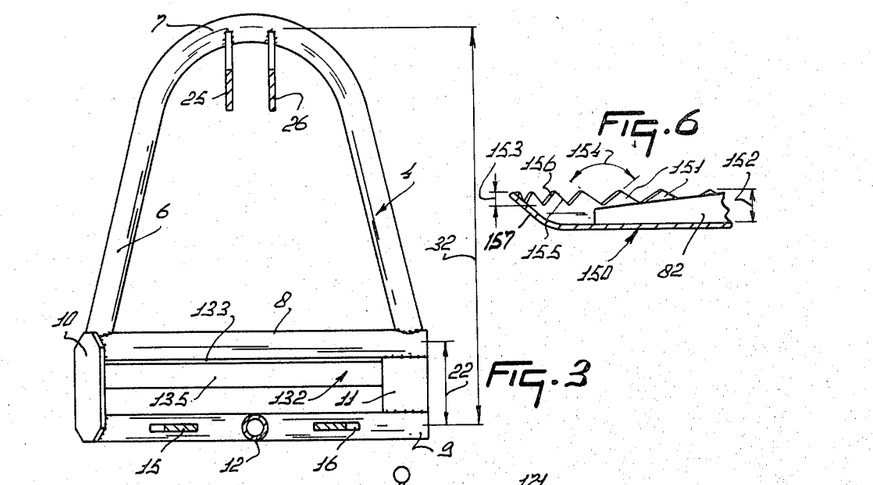
FIG. 3 is a view taken on the line III—III in FIG. 1.
FIG. 6 is a sectional view of part of a further embodiment of part of the spreader.

In order to avoid adverse effects resulting from impingement of material against frame parts extending upwardly around the distribution member, the frame is designed so that the material ejected by the distribution member 3 will impinge as little as possible on frame parts. As is shown in the sectional view of FIG. 2 the frame is constructed so that around the distribution member there are only three frame parts. Moreover, these frame parts are shaped and oriented so that the probability of contact with ejected material is minimized. In the plane at the level of the member 3 and perpendicular to the rotary axis 39 of the distribution member, said frame parts have an elongate cross-section. The length of the sectional area is substantially parallel to the direction of movement of the material past the frame part. Therefore, the frame parts 10, 11 and 28 are made from strip material. These parts are disposed with their width oriented as shown in FIG. 2 in accordance with the foregoing considerations. The width of the strip 28 is at an angle 140 of about 35° to the vertical plane 20. The width of the strip 11 is substantially transverse of the direction of travel 44 in the plane 20. The strip 10 is disposed so that its width is at an angle 141 of about 35° to the vertical plane 20. Although the direction of spreading of different kinds of materials will vary, to some extent depending upon the speed of rotation of the distribution member, the frame parts 10, 11 and 28 are disposed so that their widths are, insofar as possible, parallel to the mean direction of spreading of different kinds of material. The material ejected to the front with respect to the direction of movement 44 passes between the crossbars 8 and 9 of the vertical frame portion 4. The short parts 10 and 11 interconnect mainly the horizontal and vertical frame portions 5 and 4 respectively without having an adverse effect on the distribution of the material in all directions.

When the device is not in use, it can be stood on a supporting surface, for example the ground, so that the lower side of the beam 9 and the plate 14 are in contact with the ground.

In the embodiment shown in FIGS. 1 to 5 the periphery of the distribution member is the upper edge of the inclined rim 79, this top edge lying in a plane perpendicular to the rotary axis 39 of the distribution member. Such a distribution member has a simple construction yet provides a satisfactory distribution pattern. For some kinds of material it may, however, be advantageous to use a distribution member of which the top edge does not lie in a flat plane. For example, the rim may be constructed as shown in FIG. 6, which shows an embodiment in which the top side of the upright rim 157 is serrated. The distribution member 150, shown only partly, has pointed extensions 151. The serrations of the rim 157 have a height 153 substantially equal to half the height of the rim. Adjacent sides, for example 155 and 156, are at an angle 154 of at least about 90° to one another. In this embodiment the angle 154 between adjacent extensions 151 is about 120°. With this serrated rim, a few granular or powdery particles of the material to be spread will move up to the tips of the serrations and leave the distribution member near these tips, whereas other particles will leave the distribution member at the lowermost points of the rim between neighboring serrations. This enhances the uniform distribution of the material. Although in this embodiment the extensions 151 are pointed, the top edge of the upright rim 157 of the distribution member may, as an alternative, undulate.

Regardless of the structure of the periphery of the distribution member, the speed of rotation of the distribution member will have an appreciable influence on the distance over which the material is spread. The speed of rotation can be set so that during the advance of the device the material can be spread at will over strips of soil having larger or smaller widths. This may be important for spreading material in row cultures. By reducing the speed of rotation the material is thrown out over a smaller distance so that it can be spread, for example, on a strip between bushes without being thrown into the bushes.

Figure 7:
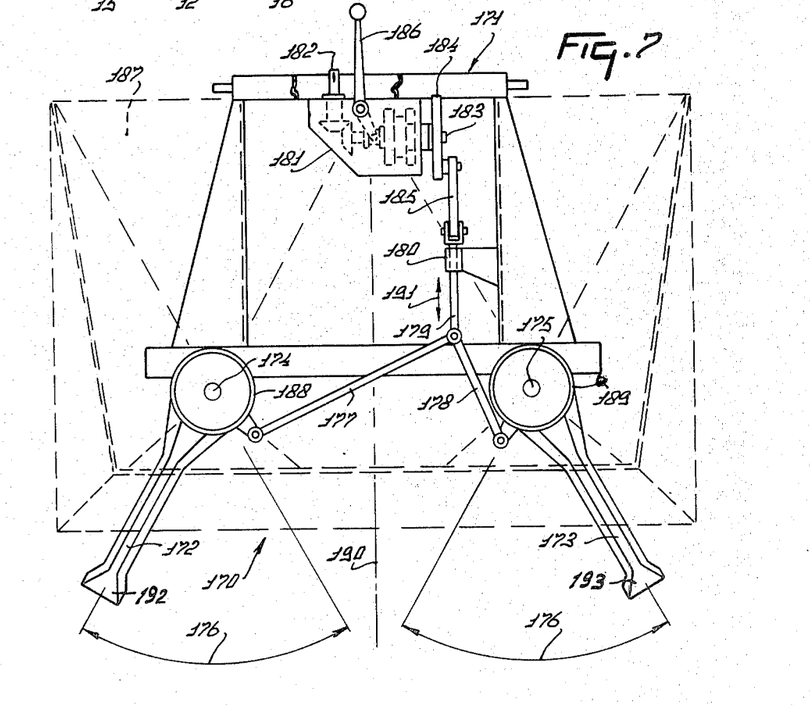
FIG. 7 is a schematic plan view of a further embodiment of a spreader.

Although in the foregoing embodiments a spreader is shown which comprises a rotatable distribution member, the speed of rotation of which is changed within limits, as desired, the width of spreading of the material is also changed by varying the speed of movement of distribution members performing a different movement. FIG. 7 illustrates schematically such an embodiment in which two distribution members are provided which are adapted to reciprocate about axes of rotation.

The spreader shown in FIG. 7 comprises a frame 171, which, like the frame of the preceding embodiment, can be attached to the hitch of a tractor or a similar vehicle (not shown in FIG. 7). The spreader 170 comprises two distribution members 172 and 173, which are adapted to reciprocate angularly about upwardly extending axes 174 and 175 respectively. Each of the distribution members 172 and 173 is movable through an angle 176 of about 60°. The distribution members 172 and 173 are pivotally connected to arms 177 and 178 respectively, which are themselves pivotally connected to a reciprocatory driving rod 179. The rod 179 is supported slidably in a sleeve 180 fastened to the frame 171. The frame 171 carries a gear box 181 accommodating pinion transmissions which may be identical to the transmission means of the gear box 71 of the preceding embodiment. The gear box 181 has an input shaft 182, which can be compared with the shaft 126 of the first embodiment. The shaft 182, like the shaft 126, can be connected by means of a coupling and an auxiliary shaft with the power take-off shaft of the tractor or a similar vehicle. The shaft 183 is an output shaft comparable with the shaft 70. In this embodiment the shaft 183 is provided with a disc 184, which is coupled at a position away from its rotary axis with a connecting rod 185. The connecting rod 185 is pivotally connected to the driving rod 179. The gear box 181 has a gear-change lever 186, which may be compared with the gear-change-lever 111 of the first embodiment. By displacing the lever 186, the speed of the output shaft 183 and hence of the disc 184 is varied in the manner described for the change of speed of the distribution member 3 of the preceding embodiment.

The spreader shown in FIG. 7 comprises a hopper 187 indicated only schematically by broken lines. In the device of FIG. 7 the material is supplied from the hopper 187 in dosed amounts to central parts 188 and 189 respectively of the distribution members 172 and 173 respectively. The supply of material may be regulated in the same manner as described for the preceding embodiment so that a desired flow rate can be achieved. Owing to the reciprocatory movements, the material is conveyed from the central parts 188 and 189 towards the ends 192 and 193 of the elongated distribution members 172 and 173. At the ends of the distribution members the material is ejected by their movements. Each of the distribution members spreads the material across a broad strip, while the two distribution members uniformly spread the material across a strip covering equal areas on both sides of the vertical central plane 190 of the device. The reciprocatory movements of the distribution members are obtained by the disc 184 and the connecting rod 185, which cause the driving rod 179 to reciprocate in directions of arrows 191, the distribution members 172 and 173 being caused to reciprocate angularly by the rods 177 and 178 over a sweep 176.

The speed of movement of the distribution members 172 and 173 over the sweep 176 can be changed by varying the speed of rotation of the disc 184. By varying the speed of movement of the distribution members 172 and 173 the spreading width can be adjusted. As in the preceding embodiment the spreading width can thus be controlled.

Although various features of the spreaders described that are and that are illustrated in the drawings, are set forth in the following claims as inventive features, it is to be understood the invention is not necessarily limited to these features, but may encompass other features described as shown as both, individually and in various combinations.

Having disclosed our invention, what we claim as new and desire to secure by Letters Patent of the United States is:

1. A spreader for spreading granular and/or powdery material comprising frame means, a hopper and at least one distributor in communication with said hopper, said distributor being mounted for movement to eject material during operation and turnable about an upwardly extending axis, driving means including a transmission connected to turn said distributor, said hopper including feeding means located in a lower delivery portion of said hopper, said delivery portion being rigidly contiguous with and projecting substantially perpendicularly to said axis relative to the rest of said hopper from which it directly receives material, said feeding means comprising at least one port located above said distributor.

2. A spreader as claimed in claim 1, in which said feeding means is positioned to supply material about said axis to the distributor, said feeding means comprising a plurality of ports regularly positioned around said axis.

3. A spreader as claimed in claim 2, in which said ports are spaced from said axis by a distance which is not greater than about one half the diameter of said distributor.

4. A spreader as claimed in claim 2, in which said ports are in a wall of said feeding means and said wall is substantially perpendicular to said axis.

5. A spreader as claimed in claim 4, in which said distributor is a rotatable disc with a peripheral rim and the ports are spaced above a central portion of said disc by a distance at least equal to the height of said rim.

6. A spreader as claimed in claim 1, in which said feeding means comprises a side-mounted delivery portion of said hopper and material flows sideways to said port, a closing member with at least one outlet that is registerable with said port being located adjacent the bottom of said delivery portion.

7. A spreader as claimed in claim 6, in which said transmission is located above said delivery portion and the latter is located at least partly between said transmission and the distributor.

8. A spreader as claimed in claim 7, in which said transmission is mounted on a side wall of said hopper.

9. A spreader as claimed in claim 6, in which said delivery portion has an arcuate boundary which is centered substantially on said axis.

10. A spreader as claimed in claim 9, in which the diameter of said delivery portion about equals one half the diameter of the distributor and the height of the delivery portion is about equal to one-quarter of that diameter.

11. A spreader as claimed in claim 6, in which said delivery portion has top and bottom walls extending substantially parallel to one another, the bottom wall having ports through which the material can flow to said distributor.

12. A spreader as claimed in claim 11, in which said delivery portion is inclined downwards in a direction away from said hopper.

13. A spreader as claimed in claim 12, in which said delivery portion is inclined downwardly in a forward direction with respect to the normal direction of spreader travel.

14. A spreader as claimed in claim 6, in which a deflector plate is arranged adjacent at least part of said distributor to receive an arc of material ejected therefrom and at least part of said deflector is downwardly inclined away from said axis.

15. A spreader for spreading granular and/or powdery material comprising frame means, a hopper and at least one distributor in communication with said hopper, said distributor being mounted for movement to eject material during operation and turnable about an upwardly extending axis, driving means including a transmission connected to turn said distributor, said hopper including feeding means located in a lower delivery portion of said hopper, said delivery portion being rigidly contiguous with and projecting laterally relative to the rest of said hopper from which it directly receives material, said feeding means comprising at least one port located above said distributor, said feeding means comprising a side-mounted delivery portion of said hopper whereby material flows sideways to said port, a closing member with at least one outlet that is registrable with said port being located adjacent the bottom of said delivery portion, said transmission being located above said delivery portion and the latter being located at least partly between said transmission and said distributor, said transmission being mounted on a side wall on the forward side of said hopper and said transmission being located between said delivery portion and an upwardly and forwardly inclined wall portion of the hopper front side.

16. A spreader as claimed in claim 15, in which said transmission is rigidly connected to the top of the delivery portion.

17. A spreader as claimed in claim 16, in which said distributor is fastened to a driving shaft and the latter extends through said delivery portion, said transmission comprising gear means on said driving shaft.

18. A spreader as claimed in claim 17, in which said transmission comprises change-speed gears in a gear box and said driving shaft mounts at least one gear.

19. A spreader as claimed in claim 18, in which a portion of the driving shaft is located inside said gear box and carries a plurality of pinions which adapted to be selectively coupled with said driving shaft by coupling means.

20. A spreader as claimed in claim 19, in which said coupling means has an operating mechanism extending outside said gear box and said mechanism extends towards an operator's station adjacent the spreader.

21. A spreader for spreading material such as fertilizer or seeds which comprises: a hopper which includes a lower hopper portion, and an outlet part of said hopper portion which is integral therewith and projects substantially horizontally outwardly from said hopper portion; a frame connected to said hopper which is adapted to support said hopper on a vehicle; and a material distribution member disposed substantially horizontally under said outlet part for spreading material received from said outlet part on the surface in the vicinity of the spreader as it is moved across said surface by said vehicle.

22. A spreader in accordance with claim 21, comprising a shaft, said distribution member mounted on said shaft, said shaft extending upwardly from said distribution member through said outlet part, a gear box mounted over said outlet part, substantially horizontal drive shaft means extending from said gear box which is adapted to connect to a power-take-off of said vehicle, gear means in said gear box operatively connecting said drive shaft means with said shaft.

23. A spreader in accordance with claim 22 wherein said gear means comprises an assembly including gears adapted to provide said distribution member selective rotational speeds without changing the rpm of said shaft means, and a control mechanism for said gears adapted to be manually actuated by the operator of said vehicle from said vehicle.

24. A spreader in accordance with claim 21 wherein said outlet part projects towards said vehicle and is spaced under a forward wall of said hopper.

25. A spreader in accordance with claim 24 wherein said frame is releasably connected to said hopper above said lower hopper portion at said forward wall.

26. In a spreader for granular or powdery material or the like, a hopper comprising an upper funnel-shaped portion, a lower smaller funnel-shaped portion receiving said upper portion and an outlet part extending substantially horizontally laterally from said lower portion and having an upper horizontal wall which is spaced under a forwardly upwardly inclined front wall of said upper portion, material distribution means disposed under said outlet part, shaft means supporting said distribution means extending upwardly from said distribution means through said outlet part and through said upper wall, the space defined by the interiors of said upper portion, said lower portion and said outlet part being contiguous whereby said material moves through the hopper from said upper portion to said outlet part via said lower portion.

27. A spreader in accordance with claim 26, comprising power transmission means for said distribution means which is mounted on said upper horizontal wall.

28. A spreader in accordance with claim 27 wherein said power transmission means is rigidly connected to a forward wall of said lower portion and to said upper horizontal wall.

29. A spreader in accordance with claim 26, wherein said distribution means comprises a rotatable disc, said outlet part including an outlet adapted to provide material on said disc whereby said material is ejected from said disc through 360°.

30. A spreader in accordance with claim 29 comprising a frame supporting said hopper wherein a deflector plate is secured to said frame for deflecting material ejected therefrom for a portion of said 360° ejection arc.

31. A spreader for a powdery or granular material or the like which comprises a hopper which includes a lower hopper portion having at least one upwardly extending wall and an outlet part, said outlet part having upper and lower walls which project outwardly substantially horizontally from said hopper portion, said upper wall joining said upwardly extending wall of said lower hopper portion, material distribution means extending substantially horizontally under said outlet-part, means for rotating said distribution means mounted on said upper wall adjacent said upwardly extending wall and means connecting said rotating means with said distribution means, said means for rotating being secured to said upper wall and to said upwardly extending wall.

32. A spreader in accordance with claim 31 wherein said connecting means comprises a substantially vertical shaft which extends through said outlet part between said means for rotating and said distribution means.

33. A spreader in accordance with claim 32 wherein said means for rotating comprises a gear assembly and a shaft extending horizontally from said gear assembly which is adapted to be connected to a tractor's power-take-off.

34. A hopper for a spreader suitable for spreading granular and powdery material or the like which comprises a material ejector rotatable about an upstanding axis, upper and lower hopper portions, said lower hopper portion including an offset part which has an upper wall that is intercepted by said axis and is spaced under a forwardly inclined side wall of said upper portion whereby a niche is formed in the outer side of the hopper, said offset part having a lower wall spaced under said upper wall, all interior parts of the hopper including that under said upper wall being contiguous and adapted to receive a granular or powdery material or the like to be spread, said niche being of sufficient size and of such configuration that is adapted to receive on and above said upper wall apparatus for rotating said material ejector, said material ejector being disposed under said lower wall of said offset part of said lower hopper portion and being adapted to receive material from an outlet in said offset part.

35. A hopper in accordance with claim 34 wherein said upper wall is substantially horizontal in operation.

36. A hopper in accordance with claim 35 wherein a substantially vertical wall of said lower hopper portion connects said upper wall to said inclined side wall.

* * * * *